April 7, 1970 J. B. WELLS 3,505,131
PROCESS FOR THE PREPARATION OF A CUPROUS IODIDE CONDUCTIVE FILM
Filed Oct. 2, 1967
PERCENT LIGHT TRANSMISSION VS. THICKNESS OF CUPROUS IODIDE FILMS ON .005" TYPE D MYLAR
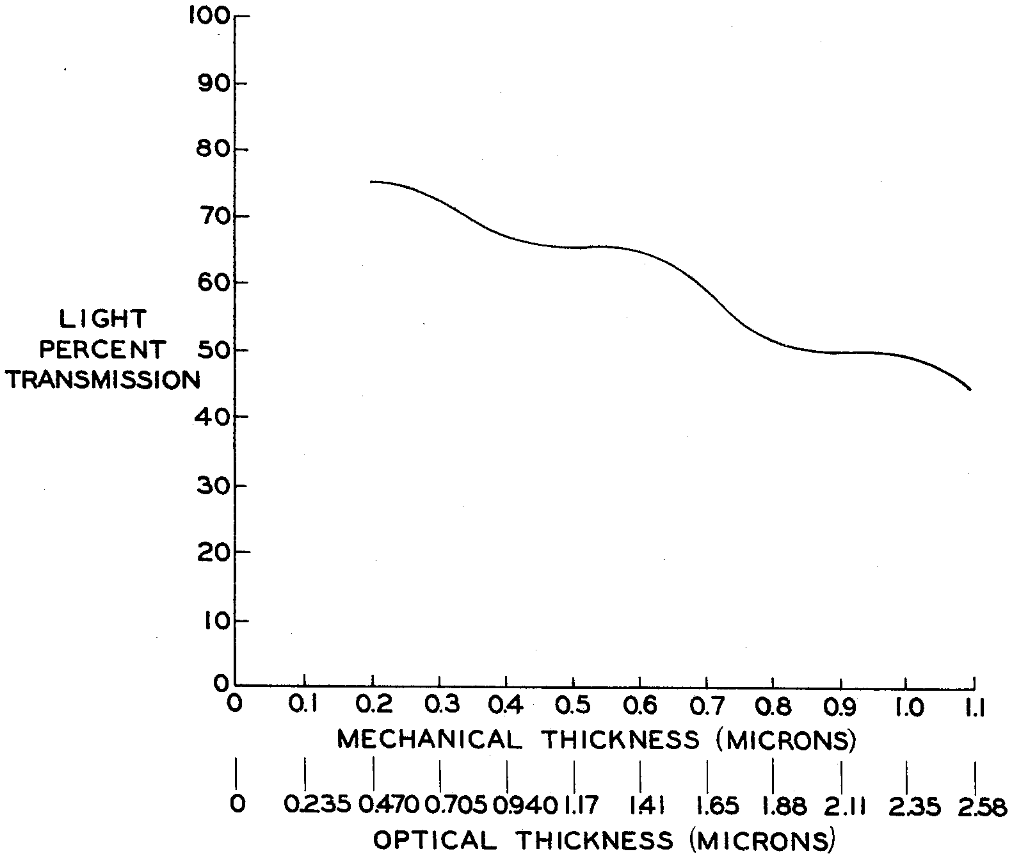
INVENTOR.
JOHN B. WELLS
BY James J. Rolsbate
ATTORNEY

United States Patent Office 3,505,131
Patented Apr. 7, 1970

3,505,131

PROCESS FOR THE PREPARATION OF A CUPROUS IODIDE CONDUCTIVE FILM

John B. Wells, Brighton, N.Y., assignor to Xerox Corporation, Rochester, N.Y., a corporation of New York Filed Oct. 2, 1967, Ser. No. 672,356
Int. Cl. C23b *5/50;* C23c *1/10;* C23f *5/02*
U.S. Cl. 148—6.14 18 Claims

ABSTRACT OF THE DISCLOSURE

A process for the preparation of clear, transparent cuprous iodide conductive film comprising:

(a) Evaporating copper onto a substrate in the absence of substantially all oxygen and water to form a copper film;

(b) Removing any oxide which may be formed on the surface of said film; and (c) Exposing said film to an iodine-hydrophobic solvent solution.

BACKGROUND OF THE INVENTION

This invention relates, in general, to electrically conductive film and, in particular, to a method for the preparation of such film. More specifically, the invention concerns a process for the formation of highly transparent cuprous iodide conductive film.

Conductive cuprous iodide film may be used in the art of electrostatic imaging as one electrode or ground in a multi-electrode electrostatic system. Where an image is formed on this electrode and is to be viewed by transmission, the electrode should be transparent.

Typical electrostatic imaging systems which may employ conductive cuprous iodide film include electrophoretic imaging (see copending application Ser. No. 384,737, filed in the U.S. Patent Office on July 23, 1964), now Patent 3,384,565, photoelectrosolography (see copending application Ser. No. 403,002, filed in the U.S. Patent Office on Oct. 12, 1964), electrostatic strip-out imaging (see copending application Ser. No. 452,641, filed in the U.S. Patent Office on May 3, 1965), electrosolography (see copending application Ser. No. 483,675, filed in the U.S. Patent Office on Aug. 30, 1965), and photodeformography (see copending application Ser. No. 520,423, filed in the U.S. Patent Office on Jan. 13, 1966), among others.

In the process of preparing such conductive cuprous iodide film, oxidation of the metal prior to conversion to cuprous iodide is extremely undesirable, since it leads to the formation of cloudy or "milky" film rather than the desired clear, transparent film. Cloudy or "milky" cuprous iodide film also results when copper is evaporated onto a substrate in the presence of water and/or oxygen, as well as when said copper is converted to copper iodide in the presence of water and/or oxygen.

Lyon, in U.S. Patent 2,756,165, describes the preparation of cuprous iodide conductive film by gaseous conversion of copper, but he does not make mention of oxygen or moisture control before and/or during the evaporation stage nor during the conversion step. Further, Lyon discloses that he has not succeeded in preparing transparent cuprous iodide film with an optical thickness greater than 1.1 microns (mechanical thickness—.47 micron). The preparation of cuprous iodide film with an optical thickness greater than 1.1 microns is desirable when said film is employed in the various types of electrostatic imaging systems mentioned above.

It is, therefore, an object of this invention to provide a method of preparing cuprous iodide film devoid of the above-noted disadvantages.

It is another object of this invention to proivde substantially clear, highly transparent cuprous iodide film.

It is still another object of this invention to provide substantially clear, highly transparent cuprous iodide film for use in electrostatic imaging systems.

It is yet another object of this invention to provide a method of preparing cuprous iodide film in the absence of substantially all oxygen.

It is yet another object of this invention to provide a method of preparing cuprous iodide film in the absence of substantially all moisture.

It is still another object of this invention to provide a method of preparing substantially clear, highly transparent cuprous iodide film of substantially any desired thickness.

It is still another further object of this invention to provide, in general, a more reliable and less costly method of preparation of cuprous iodide film than those methods disclosed by the prior art.

SUMMARY OF THE INVENTION

The foregoing objects, and others, are accomplished in accordance with this invention, generally speaking, by providing clear, transparent cuprous iodide conductive film, prepared by a method comprising:

(a) Evaporating copper onto a substrate in the absence of substantially all oxygen and water to form a copper film;

(b) Removing any oxide which may be formed on the surface of said film; and (c) Exposing said film to an iodine-hydrophobic solvent solution.

While evaporation of the copper onto a suitable substrate may be carried out under any suitable pressure, it is necessary here to employ a pressure of less than about $10^{-4}$ torr in order to avoid the production of cloudy or "milky" cuprous iodide films. Optimum clarity and transparency have been obtained by employing a pressure of less than about $10^{-6}$ torr.

Any suitable substrate material may be employed depending upon the particular electrostatic imaging system in which the transparent conductive cuprous iodide film is to be used. When used in a photoelectrosolographic, electrosolographic, photodeformographic, electrophoretic, and electrostatic-strip-out systems, a transparent substrate material is desirable so that the image may be viewed by transmission. Typical transparent substrate materials include glass, quartz, cellophane, transparent plastics such as Mylar (polyethylene terephthalate available from E. I. du Pont de Nemours & Co.), etc.

Prior to coating the substrate material with the metal, it is advisable to thoroughly cleanse said substrate material. Any suitable cleansing agent may be used. Typical cleansing agents include water, methanol, ethanol, acetone, acids, alkaline cleaners, etc. The preferred cleansing materials used to clean many of the substrate materials which may be used in this process are trisodiumphosphate and deionized water.

Once the substrate material is thoroughly cleansed, it may be either oven-dried or air-dried. Since air-drying takes approximately 2 to 4 hours, whereas drying in an oven at about 105° C. takes only about 1 hour, and also because there is less chance of further contamination with oven-drying as opposed to air-drying, the preferred technique here, with non-flammable or high-melting substrate materials, is to oven-dry.

When evaporating the copper upon the substrate material in a bell jar, it is preferred that the copper be kept at a distance ranging from approximately 14 inches to approximately 18 inches from said substrate material in order to obtin a uniform deposition of said metal upon said substrate as well as to avoid burning, melting, or otherwise injuring said substrate material.

Any suitable surface deoxidizer may be used to remove oxides from the surface of the copper. Typical surface deoxidizers include monobasic organic acids derived from natural fats and oils (also known as "fatty acids"), inorganic reducing acids, among others. Typical monobasic organic acids include arachidic acid, arachidonic acid, behemic acid, butyric acid, capric acid, caproic acid, caprylic acid, cerotic acid, cetoleic acid, decylenic acid, dodecylenic acid, eleostearic acid, enanthylic acid, erucic acid, gadoleic acid, isovaleric acid, lauric acid, licanic acid, lignoceric acid, linoleic acid, linolenic acid, margaric acid, myristic acid, nondecylic acid, oleic acid, palmitic acid, palmitoleic acid, parinaric acid, pelargonic acid, pentadecanoic acid, petroselinic acid, ricinoleic acid, selacholeic acid, stearic acid, stillingic acid, tridecoic acid, undecylic acid, vaccenic acid, among others. Typical inorganic reducing acids include antimonic acid, antimonous acid, arsenic acid, arsenious acid, boric acid, carbonic acid, chloric acid, chlorous acid, disilicic acid, germanic acid, hypobromus acid, hydrochloric acid, hydrosulfuric acid, hypochlorous acid, hypoiodus acid, hypomitrous acid, hypophosphorous acid, metaboric acid, metaphosphoric acid, metasilicic acid, nitric acid, nitrous acid, perchloric acid, periodic acid, permanganic acid, phosphoric acid, phosphorous acid, pyrophosphoric acid, pyrosulfuric acid, silicic acid, stannic acid, sulfuric acid, sulfurous acid, telluric acid, and tetraboric acid, among others. While any suitable surface deoxidizer may be used to remove oxides from the surface of the copper, the fastest and best results are obtained by employing monobasic organic acids derived from natural fats and oils because these remove oxides without attaching the surface of the copper film.

After the copper has been exposed to a surface deoxidizer, it is exposed to a hydrophobic solvent in order to remove substantially all traces of said deoxidizer. While any suitable hydrophobic solvent may be employed, it is preferred that trichloroethylene be used because it is available at a low cost, its vapors are not dangerously toxic, and it is not flammable.

Conversion to cuprous iodide may take place by exposing copper to either a halogen-hydrophobic solvent solution or to halogen vapors. However, the former method should be employed in order to obtain noncloudy, highly transparent films.

When the transparent cuprous iodide conductive films are prepared by liquid conversion, any suitable hydrophobic solvent may be used. Typical hydrophobic solvents include toluene, carbon tetrachloride, trichloroethylene, cyclohexane, 1,1,1-trichloroethane, among others. Toluene and trichloroethylene are the preferred solvents here because they are completely insoluble in water and, as compared to most other hydrophobic solvents, they have a slow rate of evaporation. Furthermore, trichloroethylene and toluene are readily available at low cost. Trichloroethylene is the most preferred hydrophobic solvent here because, as opposed to toluene, it is not flammable and its vapors are not as dangerously toxic.

While the halogen-hydrophobic solvent solution may be kept at any suitable temperature during the conversion, it is found that best results are obtained when a temperature of approximately 70° F. to approximately 80° F. is maintained. Optimum results are obtained when a temperature of approximately 75° F. is maintained during said conversion.

DESCRIPTION OF PREFERRED EMBODIMENTS

The following examples will further define various preferred embodiments of the present invention. Parts and percentages are by weight unless otherwise specified.

EXAMPLE I

A 4″ x 4″ x .005″ sheet of optical grade Type D Mylar film (manufactured by E. I. du Pont de Nemours & Co.) is washed thoroughly, first with water and then with a solution of trisodiumphosphate in water. This is followed by rinsing said film several times with deionized water and air-drying for approximately 2 hours.

After the Mylar film is thoroughly dry, it is placed on the lower surface of an aluminum backing plate, said plate being positioned on a platform supported by legs and lodged in a standard bell jar-type of apparatus used for coating various articles with metal (manufactured by Consolidated Vacuum Corporation). This apparatus comprises a metal base plate which supports the bell jar, which in turn has a vacuum tight gasket around its open edge and a standard vacuum pumping system attached to a conduit for exhausting air from said bell jar. Supported within the bell jar, and positioned approximately 16 inches below said aluminum backing plate, is a molybdenum boat.

Once the Mylar film is placed on the backing plate, an 8″ piece of copper wire (approximately 99.9% pure) is placed in the molybdenum boat, the bell jar is placed in a position on the base plate so that seal is effective, and pumping system is then operated until a pressure of approximately $10^{-7}$ torr is obtained. Electric power is applied to heat the boat holding the copper wire. This causes the wire to melt and evaporate so as to form a uniformly thin layer on the exposed surface of the Mylar film.

After evaporating the copper upon the Mylar, the coated film is removed from the chamber and immersed in stearic acid solution for several seconds in order to remove substantially all traces of copper oxide which formed on the surface of the copper. The copper film is then rinsed in substantially pure trichloroethylene solution until substantially all traces of stearic acid are washed away. The film is then immersed in a solution containing about 5 g. of iodine in about 100 cc. of trichloroethylene for approximately 30 seconds. This solution is kept at the constant temperature of about 75° F. Upon removing the film from the iodine-trichloroethylene solution, it is allowed to dry at room temperature for approximately 10 minutes. There results an electrically conductive, highly transparent cuprous iodide film with an optical thickness of approximately 2.58 microns (mechanical thickness—1.1 microns) and with a light transmission of approximately 43%. Optical thickness is measused by a Zeiss Interferometer (manufactured by Carl Zeiss) while light transmission is measured by a Model No. 1 Densichron (manufactured by Welch Scientific Company).

EXAMPLE II

A 4″ x 4″ x .005″ sheet of optical grade Type D Mylar film is washed thoroughly, first with water and then with Alconox solution (an alkaline cleaner manufactured by Alconox, Inc.). This is followed by rinsing said film several times with deionized water and air-drying for approximately 3 hours.

After the Mylar film is thoroughly dry it is placed on an aluminum backing plate in a vacuum apparatus as described in Example I.

Once the Mylar film is placed on the backing plate, a 6″ piece of copper wire (approximately 99.9% pure) is placed in the molybdenum boat which is approximately 14 inches from said backing plate and the pumping system is operated until a pressure of approximately $10^{-7}$ torr is obtained. Electric power is applied to heat the boat holding the copper wire. This causes the wire to melt and evaporate so as to form a uniformly thin layer on the exposed surface of the Mylar film.

After evaporating the copper upon the Mylar, the coated film is removed from the chamber and immersed in a weak sulfuric acid solution for several seconds in order to remove substantially all traces of copper oxide which formed on the surface of the copper. The copper film is then rinsed in substantially pure toluene solution until substantially all traces of sulfuric acid are washed away. The film is then immersed in a solution containing about 2 g. of iodine in about 100 cc. of toluene for approximately 40 seconds. This solution is kept at a constant temperature of about 70° F. Upon removing the film from the iodine-toluene solution, it is allowed to dry at room temperature for approximately 15 minutes. There results an electrically conductive, highly transparent cuprous iodide film with an optical thickness of approximately 2.35 microns (mechanical thickness—1.0 micron) and with a light transparency of approximately 50%.

EXAMPLE III

A 4" x 4" x .005" sheet of optical grade Type D Mylar film is washed thoroughly first with water and then with methanol. This is followed by rinsing said film several times with deionized water and air-drying for approximately 4 hours.

After the Mylar film is thoroughly dry it is placed on an aluminum backing plate in a vacuum apparatus as described in Example I.

Once the Mylar film is placed on the backing plate, a 4" piece of copper wire (approximately 99.9% pure) is placed in the molybdenum boat which is approximately 15 inches from said backing plate and the pumping system is operated until a pressure of approximately $10^{-6}$ torr is obtained. Electric power is applied to heat the boat holding the copper wire. This causes the wire to melt and evaporate so as to form a uniformly thin layer on the exposed surface of the Mylar film.

After evaporating the copper upon the Mylar, the coated film is removed from the chamber and immersed in linoleic acid for several seconds in order to remove substantially all traces of copper oxide which formed on the surface of the copper. The copper film is then rinsed in substantially pure carbon tetrachloride solution until substantially all traces of linoleic acid are washed away. The film is then immersed in a solution containing about 3 g. of iodine in about 90 cc. of carbon tetrachloride for approximately 25 seconds. This solution is kept at a constant temperature of about 80° F. Upon removing the film from the iodine-carbon tetrachloride solution, it is allowed to dry at room temperature for approximately 10 minutes. There results an electrically conductive, highly transparent cuprous iodide film with an optical thickness of approximately 2.11 microns (mechanical thickness—0.9 micron) and with a light transparency of approximately 50%.

EXAMPLE IV

A 4" x 4" x .005" sheet of optical grade Type D Mylar film is washed thoroughly with water. This is followed by rinsing the film several times with deionized water and air-drying for approximately 3½ hours.

After the Mylar film is thoroughly dry it is placed on an aluminum backing plate in a vacuum apparatus as described in Example I.

Once the Mylar film is placed on the backing plate, a 3" piece of copper wire (approximately 99.9% pure) is placed in the molybdenum boat which is approximately 16 inches from said backing plate and the pumping system is operated until a pressure of approximately $10^{-5}$ torr is obtained. Electric power is applied to heat the boat holding the copper wire. This causes the wire to melt and evaporate so as to form a uniformly thin layer on the exposed surface of the Mylar film.

After evaporating the copper upon the Mylar, the coated film is removed from the chamber and immersed in a weak hydrochloric acid solution for several seconds in order to remove substantially all traces of copper oxide which formed on the surface of the copper. The copper film is then rinsed in a substantially pure solution of cyclohexane until substantially all traces of the hydrochloric acid are washed away. The film is then immersed in a solution containing about 1 g. of iodine in about 110 cc. of cyclohexane for approximately 40 seconds. This solution is kept at a constant temperature of about 80° F. Upon removing the film from the iodine-cyclohexane solution, it is allowed to dry at room temperature for approximately 15 mintues. There results an electrically conductive, highly transparent cuprous iodide film with an optical thickness of approximately 1.88 microns (mechanical thickness—0.8 micron) and with a light transparency of approximately 51%.

EXAMPLE V

A 4" x 4" x .005" sheet of optical grade Type D Mylar film is washed thoroughly with water and then with Alconox solution. This is followed by rinsing said film several times in deionized water and air-drying for approximately 2 hours.

After the Mylar film is thoroughly dry it is placed on an aluminum backing plate in a vacuum apparatus as described in Example I.

Once the Mylar film is placed on the backing plate, a 2" piece of copper wire (approximately 99.9% pure) is placed in a molybdenum boat which is approximately 14 inches from said backing plate and a pumping system is operated until a pressure of approximately $10^{-5}$ torr is obtained. Electric power is applied to heat the boat holding the copper wire. This causes the wire to melt and evaporate so as to form a uniformly thin layer on the exposed surface of the Mylar film.

After evaporating the copper upon the Mylar, the coated film is removed from the chamber and immersed in linoleic acid for several seconds in order to remove substantially all traces of the copper oxide which formed on the surface of the copper. The copper film is then rinsed in a substantially pure 1,1,1-trichloroethane solution until substantially all traces of the linoleic acid are washed away. The film is then immersed in a solution containing about 4 g. of iodine in about 100 cc. of 1,1,1-trichloroethane for approximately 30 seconds. This solution is kept at a constant temperature of about 70° F. Upon removing the film from iodine-1,1,1-trichloroethane solution, it is allowed to dry at room temperature for approximately 15 minutes. There results an electrically conductive, highly transparent cuprous iodide film with an optical thickness of approximately 1.65 microns (mechanical thickness—0.7 micron) and with a light transparency of approximately 58%.

EXAMPLE VI

A 4" x 4" x .005" sheet of optical grade Type D Mylar film is washed thoroughly first with water and then with a solution of thisodiumphosphate. This is followed by rinsing said film several times with deionized water and air-drying for approximately 4 hours.

After the Mylar film is thoroughly dry it is placed on an aluminum backing plate in a vacuum apparatus as described in Example I.

Once the Mylar film is placed on the backing plate, a 1½" piece of copper wire (approximately 99.9% pure) is placed in the molybdenum boat which is approximately 15 inches from said backing plate and a pumping system is operated until a pressure of approximately $10^{-7}$ torr is obtained. Electric power is applied to heat the boat holding the copper wire. This causes the wire to melt and evaporate so as to form a uniformly thin layer on the exposed surface of the Mylar film.

After evaporating the copper upon the Mylar, the coated film is removed from the chamber and immersed in vaccenic acid for several seconds in order to remove substantially all traces of copper oxide which formed on the surface of the copper. The copper film is then rinsed in a substantially pure toluene solution until substantially all traces of the vaccenic acid are washed away. The film is then immersed in a solution containing about 5 g. of iodine and about 100 cc. of trichloroethylene for approximately 30 seconds. This solution is kept at a constant temperature of about 75° F. Upon removing the film from the iodine-trichloroethylene solution, it is allowed to dry at room temperature for approximately 10 minutes. There results an electrically conductive, highly transparent cuprous iodide film with an optical thickness of approximately .940 micron (mechanical thickness—.40 micron) and with a light transparency of approximately 66%.

EXAMPLE VII

A 4" x 4" x .005" sheet of optical grade Type D Mylar film is washed thoroughly, first with water and then with an alkaline cleaner. This is followed by rinsing said film several times with deionized water and air-drying for approximately 4 hours.

After the Mylar film is thoroughly dry it is placed on an aluminum backing plate in a vacuum apparatus as described in Example I.

Once the Mylar film is placed on the backing plate, a 1" piece of copper wire (approximately 99.9% pure) is placed in the molybdenum boat which is approximately 16 inches from said backing plate and the pumping system is operated until a pressure of approximately $10^{-7}$ torr is obtained. Electric power is applied to heat the boat holding the copper wire. This causes the wire to melt and evaporate so as to form a uniformly thin layer on the exposed surface of the Mylar film.

After evaporating the copper upon the Mylar the coated film is removed from the chamber and immersed in gadoleic acid for several seconds in order to remove substantially all traces of copper oxide which formed on the surface of the copper. The copper film is then rinsed in a substantially pure carbon tetrachloride solution until substantially all traces of the gadoleic acid are washed away. It is then immersed in a solution containing about 4 g. of iodine in about 100 cc. of toluene for approximately 40 seconds. This solution is kept at a constant temperature of about 80° F. Upon removing the film from the iodine-toluene solution, it is allowed to dry at room temperature for approximately 10 minutes. There results an electrically conductive, highly transparent cuprous iodide film with an optical thickness of approximately .47 micron (mechanical thickness—0.2 micron) and with a light transparency of approximately 75%. Examples I–VII are referred to in the graph.

EXAMPLE VIII

A 4" x 4" x .025" Pyrex glass plate (manufactured by Corning Glass Company) is thoroughly washed, first with hot water and then with a solution of Alconox. This is followed by rinsing said plate several times with deionized water and drying in an oven at approximately 105° C. for approximately 1 hour.

After the glass plate is thoroughly dry it is placed on an aluminum backing plate in a vacuum apparatus as described in Example I.

Once the glass is placed on the backing plate, a 6" piece of copper wire (approximately 99.9% pure) is placed in the molybdenum boat which is approximately 17 inches from said backing plate and the pumping system is operated until a pressure of approximately $10^{-6}$ torr is obtained. Electric power is applied to heat the boat holding the copper wire. This causes the wire to melt and evaporate so as to form a uniformly thin layer on the exposed surface of the glass plate.

After evaporating the copper upon the glass, the coated glass is removed from the chamber and immersed in a weak sulfuric acid solution for several seconds in order to remove substantially all traces of copper oxide which had formed on the surface of the copper. The copper film is then rinsed in a substantially pure 1,1,1-trichloroethane solution until substantially all traces of the sulfuric acid are washed away. It is then immersed in a solution containing about 5 g. iodine in about 100 cc. of toluene for approximately 30 seconds. This solution is kept at a constant temperature of about 75° F. Upon removing the film from the iodine-toluene solution, it is allowed to dry at room temperature for approximately 10 minutes. There results an electrically conductive, highly transparent cuprous iodide film with an optical thickness of approximately 3.40 microns (mechanical thickness—1.0 micron) and with a light transparency of approximately 50%.

While specific components of the present system are defined in the working examples above, any other typical material may be substituted in the working examples if suitable. In addition, many other variables may be introduced in the present process such as further cleansing steps or other components which may in any way affect, enhance, or otherwise improve the present process.

While various specifics are given in the present application, many modifications and ramifications will occur to those skilled in the art upon a reading of the present disclosure. These are intended to be encompassed within the scope of this invention.

What is claimed is:

1. The process for the preparation of electrically conductive, highly transparent cuprous iodide film which comprises:

(a) thoroughly cleansing a substrate material;

(b) drying said substrate material;

(c) evaporating a copper preform onto said substrate material in the absence of substantially all oxygen and moisture to form a copper film;

(d) contacting said film with a surface deoxidizer to remove oxides from the surface of said film;

(e) removing substantially all traces of said surface deoxidizer by contacting said film with a substantially pure hydrophobic solvent; and (f) exposing said film to an iodine-hydrophobic solvent solution.

2. The process according to claim 1 wherein said substrate material is substantially transparent.

3. The process according to claim 1 wherein said substrate material is thoroughly cleansed with trisodiumphosphate and deionized water.

4. The process according to claim 1 wherein said copper is kept at a distance ranging from approximately 14 inches to approximately 18 inches from said substrate material during the evaporation of said metal upon said substrate material.

5. The process according to claim 1 wherein the evaporation of said copper upon said substrate material is carried out at a pressure of less than approximately $10^{-4}$ torr.

6. The process according to claim 1 wherein said surface deoxidizer is selected from the group consisting of inorganic reducing acids, monobasic organic acids, and mixtures thereof.

7. The process of claim 1 wherein said hydrophobic solvent in steps (e) and (f) is selected from the group consisting of toluene, trichloroethylene, and mixtures thereof.

8. The process of claim 1 wherein the temperature of said iodine-hydrophobic solvent solution is maintained at approximately 70° F. to approximately 80° F.

9. The process according to claim 5 wherein said evaporation is carried out at a pressure of less than approximately $10^{-6}$ torr.

10. The process according to claim 6 wherein said surface deoxidizer is a monobasic organic acid.

11. The process of claim 7 wherein said hydrophobic solvent is trichloroethylene.

12. The process of claim 8 wherein said temperature is approximately 75° F.

13. A process for the preparation of highly transparent cuprous iodide film which comprises evaporating copper upon a substrate material in the absence of substantially all oxygen and moisture to form a copper film and exposing said copper film while free of any oxide film to an iodine-hydrophobic solvent solution.

14. The process of claim 13 wherein said substrate material is substantially transparent.

15. The process of claim 13 wherein the evaporation of said copper upon said substrate material is carried out at a pressure of less than approximately $10^{-4}$ torr.

16. The process of claim 13 wherein said hydrophobic solvent is selected from the group consisting of toluene, trichloroethylene, and mixtures thereof.

17. The process of claim 13 wherein said copper film is contacted with a surface deoxidizer prior to exposing it to an iodine-hydrophobic solvent solution.

18. The process of claim 17 wherein said surface deoxidizer is a monobasic organic acid.

References Cited

UNITED STATES PATENTS 2,491,837 12/1949 Smith-Johnnsen et al. 148—6.14 X 2,756,165 7/1956 Lyon ---------------- 117—211

RALPH S. KENDALL, Primary Examiner

U.S. Cl. X.R.

117—107, 211, 217